(12) United States Patent
Mariani et al.

(10) Patent No.: US 6,727,742 B2
(45) Date of Patent: Apr. 27, 2004

(54) HIGH-VOLTAGE LEVEL SHIFTING CIRCUIT WITH OPTIMIZED RESPONSE TIME

(75) Inventors: Adalberto Mariani, Garlasco (IT); Giulio Corva, Vittuone (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/053,638

(22) Filed: Jan. 24, 2002

(65) Prior Publication Data

US 2002/0125932 A1 Sep. 12, 2002

(30) Foreign Application Priority Data

Jan. 29, 2001 (IT) ...................................... MI2001A0159

(51) Int. Cl.[7] ................................................ H03L 5/00
(52) U.S. Cl. ........................ 327/333; 327/108; 327/589
(58) Field of Search ........................ 327/108, 109–112, 327/333, 589; 326/80, 81, 87, 88

(56) References Cited

U.S. PATENT DOCUMENTS 5,160,854 A * 11/1992 Martignoni et al. ........ 327/108
6,037,720 A * 3/2000 Wong et al. ................. 315/291
6,353,345 B1 * 3/2002 Yushan et al. .............. 327/112

* cited by examiner

Primary Examiner—Terry D. Cunningham
Assistant Examiner—Quan Tra
(74) Attorney, Agent, or Firm—Guido Modiano; Albert Josif; Daniel O'Byrne

(57) ABSTRACT

A high-voltage level shifting circuit with optimized response time, comprising: an inverter having an input and an output, the inverter being connected between a first voltage and a second voltage whose difference remains constant over time; a resistor, in which one terminal is connected to the first voltage and a second terminal is connected to the input of the inverter; a high-voltage transistor, which is connected between the second terminal of the resistor and a current source whose switching on and off determine the level shifting of a digital signal; and a clamp transistor, which is connected between the first voltage and a node that is common to the resistor and to the high-voltage transistor. The gate terminal of the clamp transistor is connected to the output of the inverter.

10 Claims, 3 Drawing Sheets

HIGH-VOLTAGE LEVEL SHIFTING CIRCUIT WITH OPTIMIZED RESPONSE TIME

BACKGROUND OF THE INVENTION

The present invention relates to a high-voltage level shifting circuit with optimized response time.

More particularly, the invention relates to a high-voltage level shifting circuit particularly suitable for use in a switching regulator of the buck converter type, the level shifting circuit being used for the driver of an input power transistor (commonly known as HSIDE).

It is known that the HSIDE input power transistor driver of a switching regulator of the buck converter type requires a circuit, commonly termed high-voltage level shifting, whose task is to reference to two voltages, termed VBOOT and VPHASE, whose difference remains fixed over time, a digital logic signal X referenced to the supply voltage VDD.

The two voltages VBOOT and VPHASE can vary suddenly by tens of volts.

The circuit shown in FIG. 1 illustrates a solution that is currently in use.

The level shifting of the digital signal X occurs by switching on and off a current Idd, and this allows to drive, by means of a resistor R1 the gate terminal of the inverter constituted by the pair of transistors M1 and M2.

The inverter must be sized so as to have the highest possible threshold, since when the voltage VPHASE (which is normally between –0.8 V and Vin, where Vin is typically 20 V) is equal to –0.8 V and the digital signal X is equal to 1, the voltage Vg at the node that is common to the gate terminals of the transistors M1 and M2 that compose the inverter can drop at the most to the ground value, and this must ensure the presence of a logic 1 on the signal X.

However, this solution has drawbacks.

First of all, the voltage drop across the resistor R1 must be such as to ensure a logic signal 1 on the digital signal X, taking into account all temperature effects and all process variations. This entails oversizing (by at least 100%, which in the case of the implemented circuit corresponds to 1.5 V) such drop in typical conditions.

This has an effect on the off time of the signal X, i.e., when X passes from 1 to 0, since the drop across the resistor R1 must decrease from the voltage drop determined by the product of the value of the resistor R1 and the value of the current Idd to the tripping value, through a transient characterized by the time constant determined by the product of the value of the resistor R1 and the sum of the value of the parasitic capacitor Cr (parasitic capacitance of the resistor R1) and of the parasitic capacitor Cp (parasitic capacitance of the high-voltage power transistor, MHV).

When the signal X is equal to 0, if the two voltages VBOOT and VPHASE rise suddenly (for example up to 20 V in 24 ns), in many practical applications the value of the parasitic capacitor Cp is such as to keep low the voltage Vg, to the point of switching on the clamp transistor M3. In this case, the output X is, for a certain time, at an incorrect logic value 1, and this time must be subsequently eliminated with a time-constant filter equal to the time for which the output X is at the incorrect logic value 1.

The time determined above is the time that the transient caused by the time constant determined by the product of the sum of the values of the above cited parasitic capacitors and the value of the resistor R1 requires in order to return the voltage across the resistor R1 from approximately VDD to the tripping threshold of the inverter formed by the pair of transistors M1 and M2.

SUMMARY OF THE INVENTION

The aim of the present invention is to provide a high-voltage level shifting circuit with optimized response time, in which the time for which the output X is at an incorrect digital value can be reduced simply by ensuring that the drop on the resistor R1 is reduced to a value that is just sufficient to ensure a logic 1 on the digital signal X.

Within this aim, an object of the present invention is to provide a high-voltage level shifting circuit in which the output of the circuit is not at an incorrect logic value 1 for a preset time.

Another object of the present invention is to provide a high-voltage level shifting circuit requiring filters for time constants that are optimized and reduced with respect to the filters currently used in level shifting circuits.

Another object of the present invention is to provide a high-voltage level shifting circuit that requires, like circuits of the known kind, an oversizing of the voltage drop across the resistor R1.

Another object of the present invention is to provide a high-voltage level shifting circuit that is highly reliable, relatively simple to manufacture and at competitive costs.

This aim and these and other objects that will become better apparent hereinafter are achieved by a high-voltage level shifting circuit with optimized response time, comprising: an inverter having an input and an output, the inverter being connected between a first voltage and a second voltage whose difference remains constant over time; a resistor, in which one terminal is connected to said first voltage and a second terminal is connected to an input of said inverter; a high-voltage transistor, which is connected between said second terminal of said resistor and a current source whose switching on and off determine a level shifting of a digital signal; and a clamp transistor, which is connected between said first voltage and a node that is common to said resistor and to said high-voltage transistor; characterized in that the gate terminal of said clamp transistor is connected to the output of said inverter.

BRIEF DESCRIPTION OF THE DRAWINGS

Further characteristics and advantages will become better apparent from the description of a preferred but not exclusive embodiment of the level shifting circuit according to the present invention, illustrated only by way of non-limitative example in the accompanying drawings, wherein.

DESCRIPTION OF THE PREFERRED EMBODIMENTS

Figure 3:
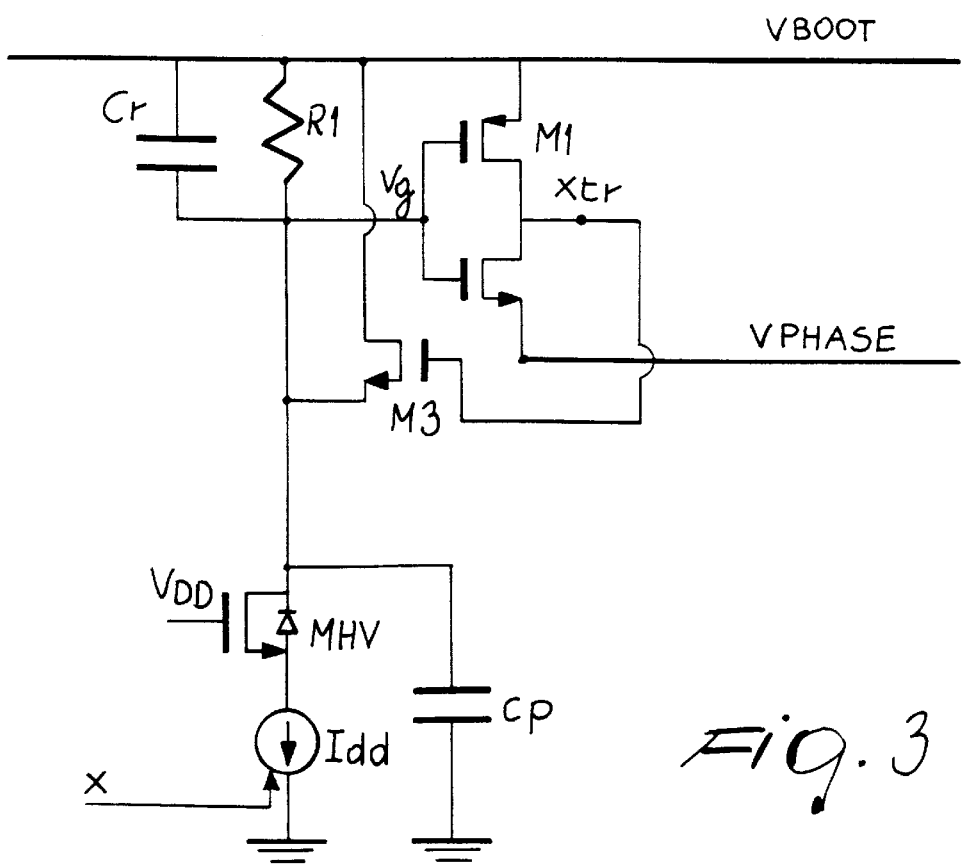
FIG. 3 is a circuit diagram of the high-voltage level shifting circuit according to the present invention.

With reference to the figures, in which identical reference numerals designate identical elements, the level shifting circuit according to the invention is described with particular reference to FIG. 3.

The basic concept of the level shifting circuit according to the present invention is that instead of simply bringing the input voltage Vin (reference should be made to FIG. 2 for the conceptual diagram) to a logic value 0, the output voltage Vo is read so as to lower Vin to a value that is in any case sufficient to ensure a logic value of 1 on said output.

Figure 1:
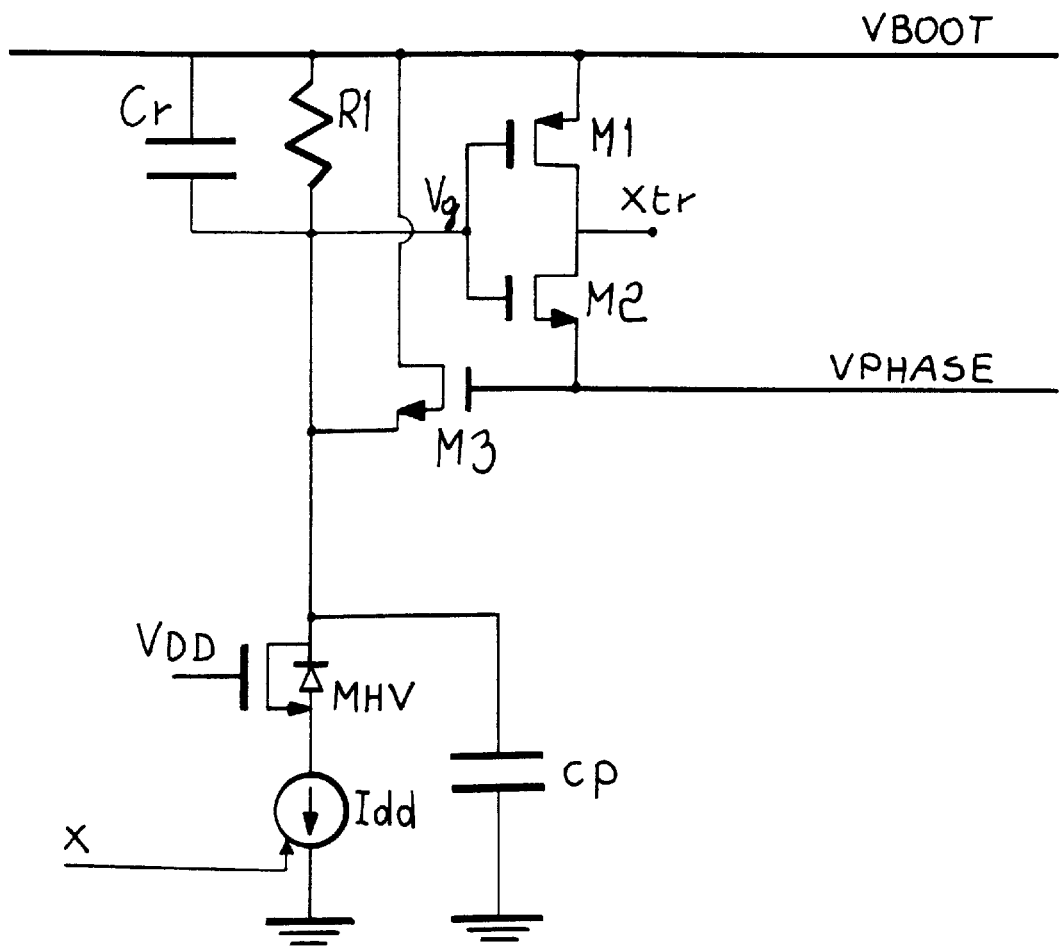
FIG. 1 is a circuit diagram of a conventional high-voltage level shifting circuit.

The input voltage Vin is the voltage that in FIGS. 1 and 3 is designated by Vg, while the output voltage Vo is the voltage designated by Xtr in FIGS. 1 and 3.

Figure 2:
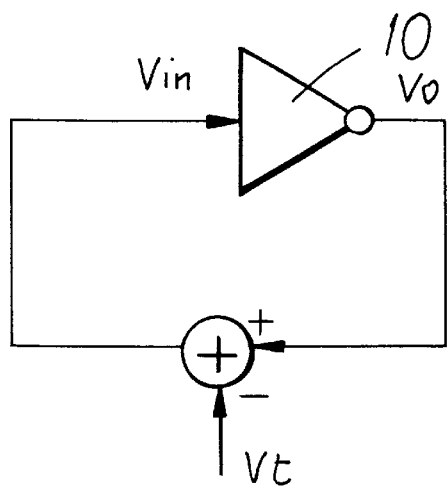
FIG. 2 is a conceptual circuit diagram used to illustrate the high-voltage level shifting circuit according to the present invention.

The inverter designated by the reference numeral 10 in FIG. 2 is the inverter constituted by the pair of transistors M1 and M2 shown in FIGS. 1 and 3.

FIG. 2 illustrates a voltage Vt, which constitutes the threshold of the transistor M3, which again is shown in FIGS. 1 and 3.

At this point, the linearized equation of the inverter 10 (i.e., the inverter M1–M2) is considered:

$$\left(Vo - \frac{Vdd}{2}\right) = Ax(Vin - Vx)$$

where Vdd is the supply voltage of the inverter, Ax is the gain, and Vx is the tripping voltage (the voltage for which Vo=Vdd/2). The feedback network is instead characterized by the following equation:

$$Vin = Vo - Vt$$

By solving the system between the two equations, one obtains:

$$Vo = \frac{AxVi + AxVx + \frac{Vdd}{2}}{1 + Ax}$$

Considering the rather realistic hypothesis that Ax>>1

$$Vo \cong Vt + Vx$$

$$Vin \cong Vx$$

The two relations show that:

Vo is equal to Vt+Vx; assuming that the inverter is symmetrical (i.e., Vx =Vdd/2), this value is sufficient to ensure recognition of a logic value of 1. An additional margin can be ensured by using an inverter whose threshold is imbalanced upward (¾ Vdd).

Vin is equal to Vx, i.e., exactly the tripping threshold; it is not necessary to bring Vin to lower voltages.

This theoretical discussion can be implemented in the circuit shown in FIG. 3.

As clearly shown, in this circuit, which is fully similar to the circuit of FIG. 1, the inverter M1–M2 is connected between the two voltages VBOOT and VPHASE and the clamp transistor M3 is connected between the voltage VBOOT and the high-voltage transistor MHV, which is supplied with the voltage VDD.

Differently from FIG. 1, in which the gate terminal of the transistor M3 is connected to the other voltage VPHASE, in the circuit of FIG. 3, according to the present invention, the gate terminal of the clamp transistor M3 is connected to the output of the inverter, Xtr.

In this manner, the voltage Vg is leveled to a threshold Vth below Xtr. The threshold Vth is the threshold of the transistor M3.

This fedback clamp ensures a logic signal Xtr that is equal to 1 when X=1, and also limits the drop on R1 approximately to typical mV's beyond to the tripping voltage of the inverter M1–M2, and also ensures a consequent reduction of the times Toff and Tglitch defined above with reference to FIG. 1.

In order to obtain the voltage Xtr it is sufficient to find the intersection between the feedback relation Xtr=Vg+Vth, which characterizes as a first approximation the effect of the fedback MOS transistor M3, and the transfer function Xtr= f(Vg) of the inverter M1–M2 with a high threshold.

Figure 4A:
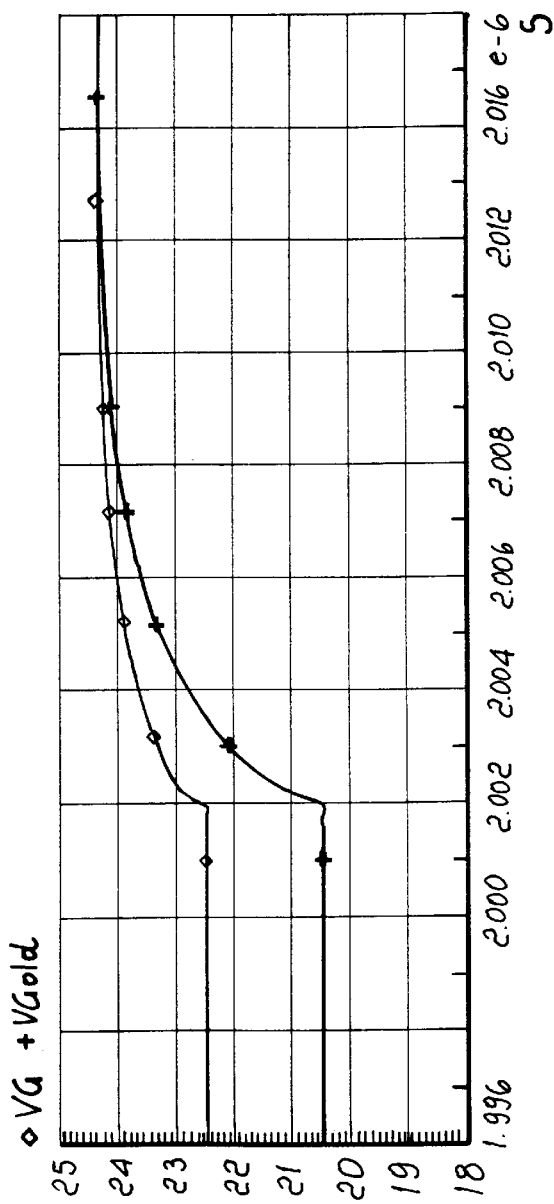
FIGS. 4a and 4b plot the output and input voltages, respectively comparing the solution according to the present invention with the known type of circuit.
Figure 4B:
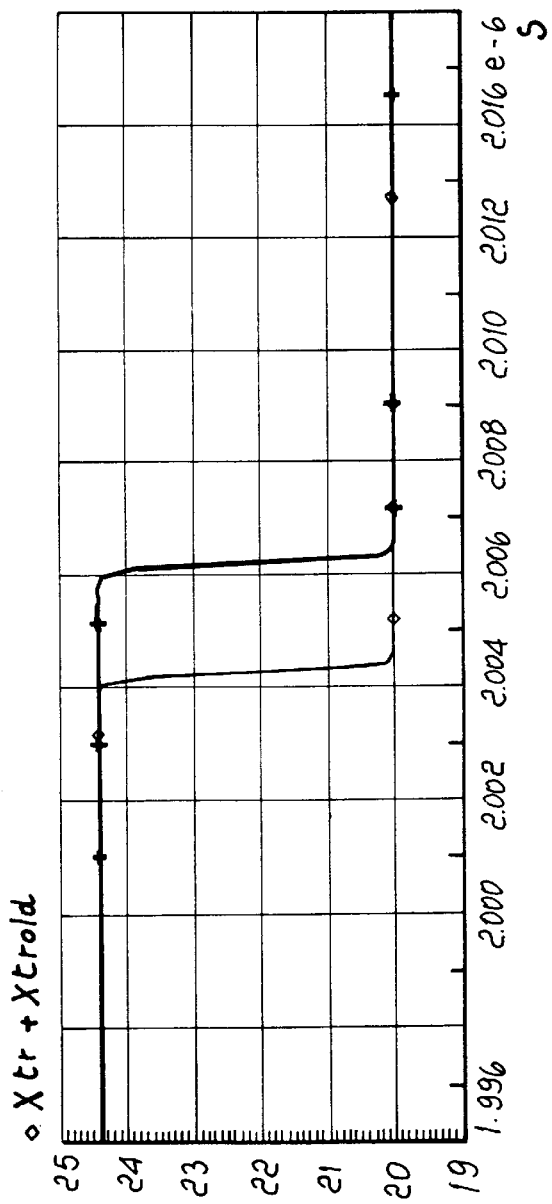

FIGS. 4a and 4b plot the output and input voltages, respectively, where Vgold and Xtrold are respectively the input voltage and the output voltage in the case of FIG. 1, while Vg and Xtr are respectively the input voltage and the output voltage with the circuit of FIG. 3, according to the present invention.

With the solution according to the invention, since the clamp is fedback, an analysis is necessary in order to check the stability of the feedback. In many practical applications, DC gain is lower than 1 and the loop is inherently stable.

Going back to FIGS. 4a and 4b, it can be noted that the off time, i.e., the transition of X from 1 to 0, is reduced from 5 ns to 3 ns. These values are of course merely non-limitative examples of the inventive concept expressed by the present invention.

In practice, it has been found that the circuit according to the present invention fully achieves the intended aim and objects, since it allows to perform level shifting of a digital signal X with reduced times, at the same time limiting to a minimum the voltage drop across the resistor R1, reducing the off time Toff and the time Tglitch during which the output of the circuit is at an incorrect logic value 1.

The circuit thus conceived is susceptible of numerous modifications and variations, all of which are within the scope of the inventive concept; all the details may further be replaced with other technically equivalent elements.

The disclosures in Italian Patent Application No. MI2001A000159 from which this application claims priority are incorporated herein by reference.

What is claimed is:

1. A high-voltage level shifting circuit with optimized response time, comprising; an inverter having an input and an output, the inverter being connected between a first voltage and a second voltage whose difference remains constant over time; a resistor, in which one terminal is connected to said first voltage and a second terminal is connected to the input of said inverter; a high-voltage transistor, which is connected between said second terminal of said resistor and a current source whose switching on and off determine a level shifting of a digital signal; and a clamp transistor, which is connected between said first voltage and a node that is common to said resistor and to said high-voltage transistor; wherein the gate terminal of said clamp transistor is connected directly to the output of said inverter.

2. The circuit according to claim 1, wherein said clamp transistor is a MOS transistor.

3. The circuit according to claim 1, wherein an input voltage of said inverter is leveled to a threshold below an output voltage of the inverter, which is equal to the threshold of the clamp transistor.

4. The circuit according to claim 1, wherein said clamp transistor lowers a voltage drop across the resistor to a value which is in any case high enough to ensure a logic 1 at an output of the inverter (ensures a logic output signal of said inverter that is equal to 1 when said digital signal is equal to 1).

5. The circuit according to claim 3, wherein said output voltage of said inverter is determined by an intersection between a feedback relation that characterizes the effect of said clamp transistor and a transfer function of said inverter with a high threshold.

6. A method for high-voltage level shifting of a digital signal, using a high-voltage level shifting circuit which comprises: an inverter, which is connected between a first voltage and a second voltage whose difference remains constant over time; a resistor, which is connected between said first voltage and an input of said inverter, a high-voltage transistor, which is connected between said inverter and a current source whose switching on/off determines a level shifting of said digital signal; and a clamp transistor, which is connected between said first voltage and a point that is common to a connection between said resistor and said high-voltage transistor, the gate terminal of said clamp transistor being connected directly to the output of the inverter; (comprising the step of reading) said transistor lowering a voltage drop across the resistor, thus increasing an output voltage of said inverter, (so as to lower an input voltage of said inverter until) to a value (is obtained) which is in any case (sufficient) high enough to ensure a logic value of 1 on an output of said inverter.

7. The method according to claim 6, wherein an output voltage of said inverter is read by connecting said clamp transistor in fedback mode to the input (output) of said inverter.

8. The method according to claim 7, wherein said high-voltage transistor is supplied by a supply voltage.

9. The method according to claim 6, wherein said output voltage of said inverter is obtained by means of an intersection between a feedback relation that characterizes the effect of said clamp transistor fedback to the (output) input of said inverter and the transfer function of said inverter with high threshold.

10. The method according to claim 6, wherein said clamp transistor fedback to the input (output) of said inverter ensures an output voltage of said inverter whose logic value is equal to 1 when said digital signal is equal to 1.

* * * * *